(12) United States Patent
Kim et al.

(10) Patent No.: US 7,684,397 B2
(45) Date of Patent: Mar. 23, 2010

(54) SYMMETRIC NETWORK ADDRESS TRANSLATION SYSTEM USING STUN TECHNIQUE AND METHOD FOR IMPLEMENTING THE SAME

(75) Inventors: Si-Baek Kim, Suwon-si (KR); Dae-Hyun Lee, Suwon-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 484 days.

(21) Appl. No.: 11/645,641

(22) Filed: Dec. 27, 2006

(65) Prior Publication Data

US 2007/0189311 A1    Aug. 16, 2007

(30) Foreign Application Priority Data

Feb. 13, 2006    (KR)   ...................... 10-2006-0013905

(51) Int. Cl.
*H04L 12/56*    (2006.01)

(52) U.S. Cl. ...................... 370/389; 370/395.2; 370/466

(58) Field of Classification Search ........................ None
See application file for complete search history.

(56) References Cited

U.S. PATENT DOCUMENTS

| | | | |
|---|---|---|---|
| 6,928,082 B2 * | 8/2005 | Liu et al. .................... | 370/401 |
| 2005/0201304 A1 | 9/2005 | Olshansky | |
| 2006/0120293 A1 * | 6/2006 | Wing ......................... | 370/241 |
| 2006/0272009 A1 * | 11/2006 | Stott ........................... | 726/3 |

FOREIGN PATENT DOCUMENTS

| | | |
|---|---|---|
| KR | 10-2005-0001125 | 1/2005 |
| KR | 10-2006-0018996 | 3/2006 |

OTHER PUBLICATIONS

Rosengberg, J, Request for Comment: 3489, Mar. 2003, p. 6.*
Korean Office action corresponding to Korean Patent Application No. 10-2006-13905, issued on Feb. 23, 2007.
European Search Report corresponding to European Patent Application No. 07001321.4, issued on Mar. 15, 2007.

(Continued)

*Primary Examiner*—Daniel J Ryman
*Assistant Examiner*—Tito Pham
(74) *Attorney, Agent, or Firm*—Robert E. Bushnell, Esq.

(57) ABSTRACT

In a symmetric network address translation system using a Simple Traversal of UDP over NAT (STUN) technique and a method for implementing the same, a voice over Internet protocol (VoIP) network includes a STUN server for transmitting, to a private network terminal, a public Internet Protocol (IP) address and first port information of a router which is used for a VoIP call. The private network terminal transmits a session setup request message, including the public IP address and the first port information of the router, through its private IP address and a second port, and the router maps and stores the public IP address and the first port information of the router, and the private IP address and the second port of the private network terminal, and routes a packet received through the public IP address and the first port to the private IP address and the second port. Thus, a VoIP call is performed using the symmetric network address translation system to which the STUN technique is applied.

16 Claims, 12 Drawing Sheets

OTHER PUBLICATIONS

"Symmetric NAT Traversal using STUN" by Takeda. Panasonic Communications Research Laboratory, Internet Engineering Task Force, Jun. 2003.

"Managing Client Initiated Connections in the Session Initiation Protocol (SIP)" by Jennings, et al. Cisco Systems, Internet Engineering Task Force, Oct. 23, 2005.

"NAT and Firewall Scenarios and Solutions for SIP" by Rosenberg. Cisco Systems, Internet Engineering Task Force, Jun. 24, 2002.

Korean Decision of Grant corresponding to Korean Patent Application No. 2006-0013905, issued on Aug. 8, 2007.

"Symmetric NAT Traversal Using STUN", to Takeda. Jun. 2003.

* cited by examiner

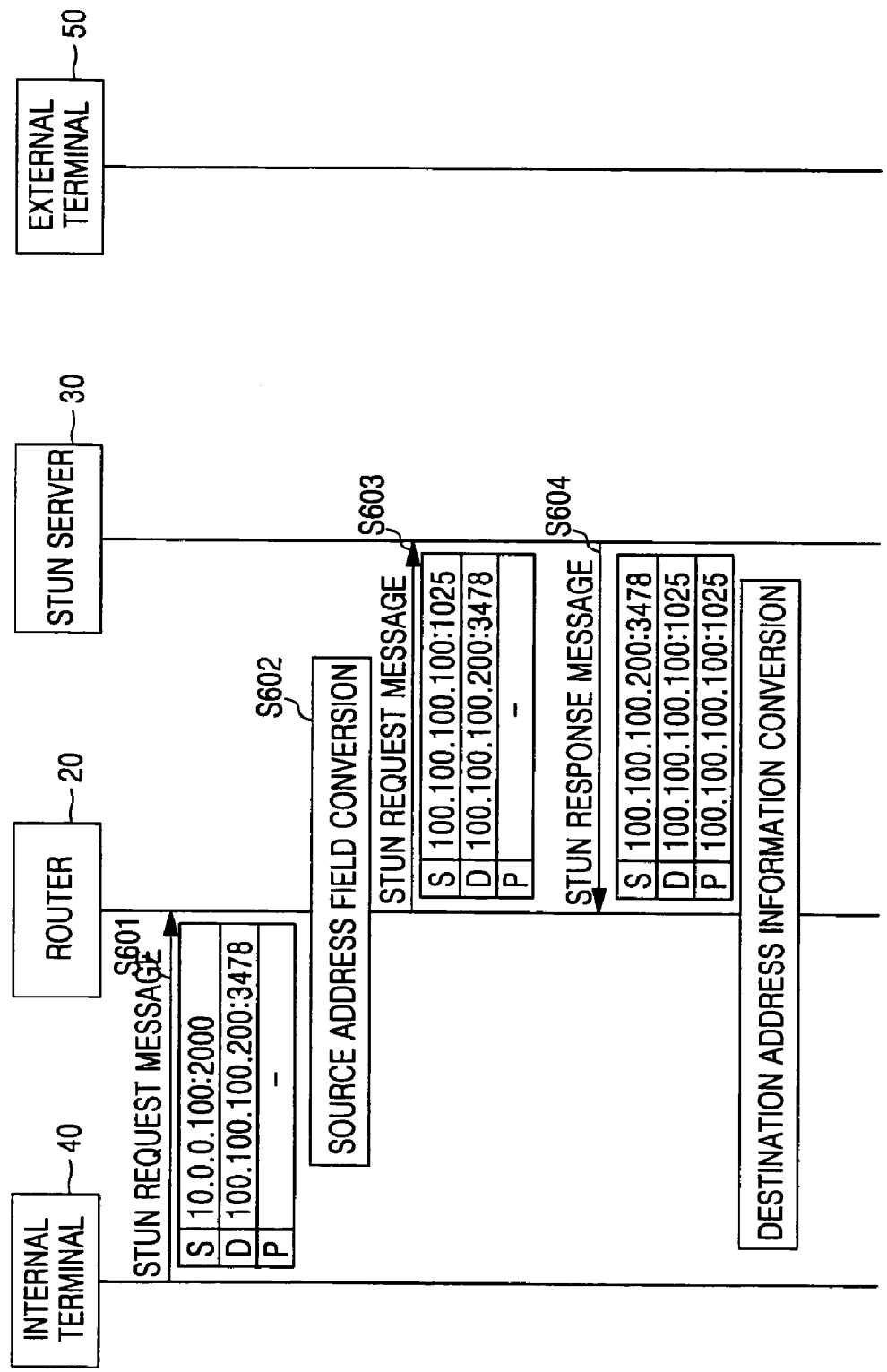

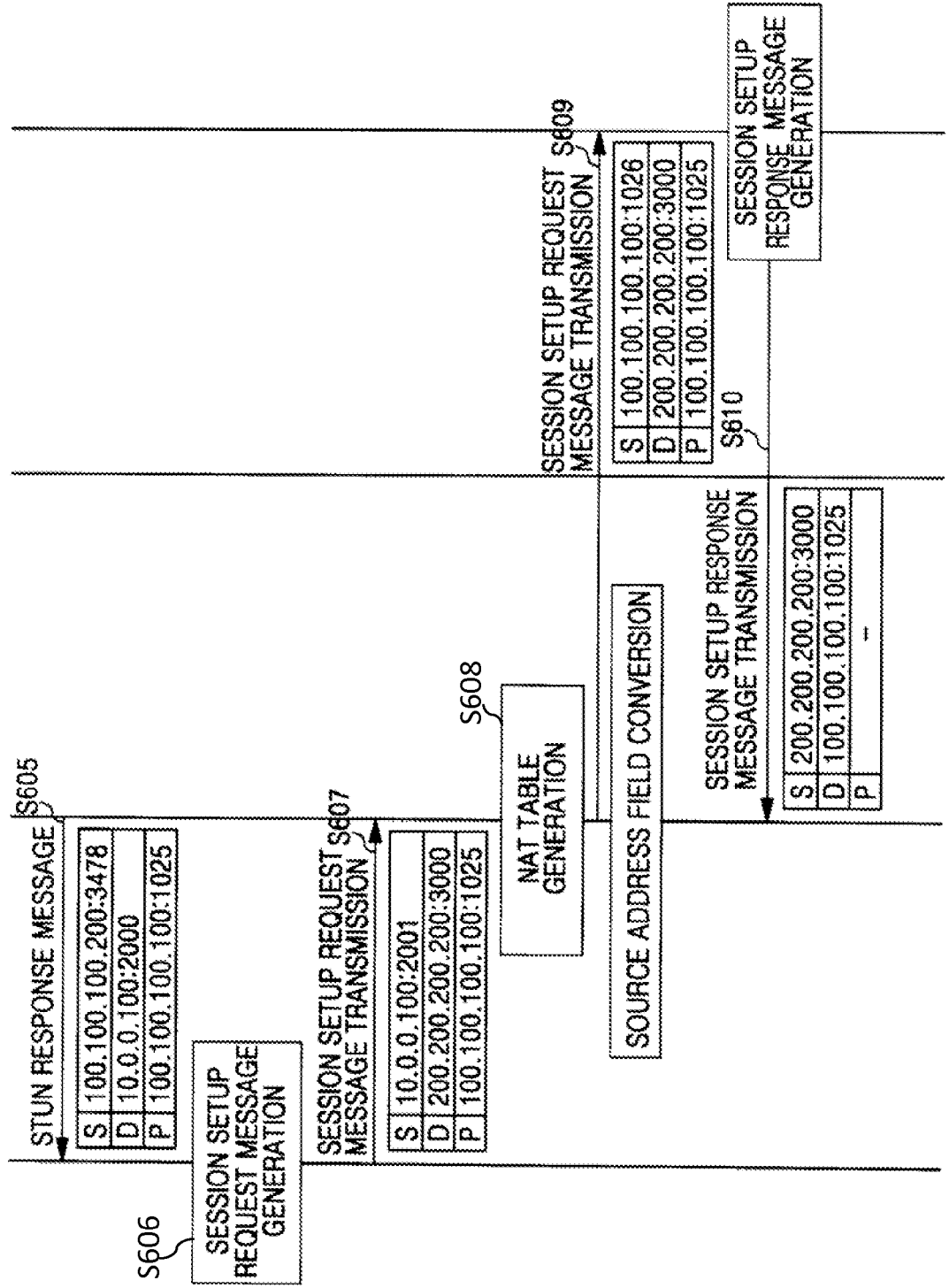

FIG. 7

INTERNAL → EXTERNAL — 24a

| No | Inside src IP:port | Inside dst IP:port | Outside src IP:port | Outside dst IP:port |
|---|---|---|---|---|
| 1 | 10.0.0.100:2000 | 100.100.100.200:3478 | 100.100.100.200:1025 | 100.100.100.200:3478 |
| 2 | 10.0.0.100:2001 | 200.200.200.200:3000 | 100.100.100.200:1026 | 200.200.200.200:3000 |

EXTERNAL → INTERNAL

| No | Outside src IP:port | Outside dst IP:port | Inside src IP:port | Inside dst IP:port |
|---|---|---|---|---|
| 1 | ANY | 100.100.100.100:1025 | 100.100.100.100:1025 | 10.0.0.100:2001 |

24b

NAT TABLE — 24

| STUN Message Type | Message Length |
|---|---|
| Transaction ID ||

```
 0                   1                   2                   3
 0 1 2 3 4 5 6 7 8 9 0 1 2 3 4 5 6 7 8 9 0 1 2 3 4 5 6 7 8 9 0 1
```

| Type | Length |
|---|---|
| Value ||

```
 0                   1                   2                   3
 0 1 2 3 4 5 6 7 8 9 0 1 2 3 4 5 6 7 8 9 0 1 2 3 4 5 6 7 8 9 0 1
```

| x x x x x x x x | Family | Port |
|---|---|---|
| Address |||

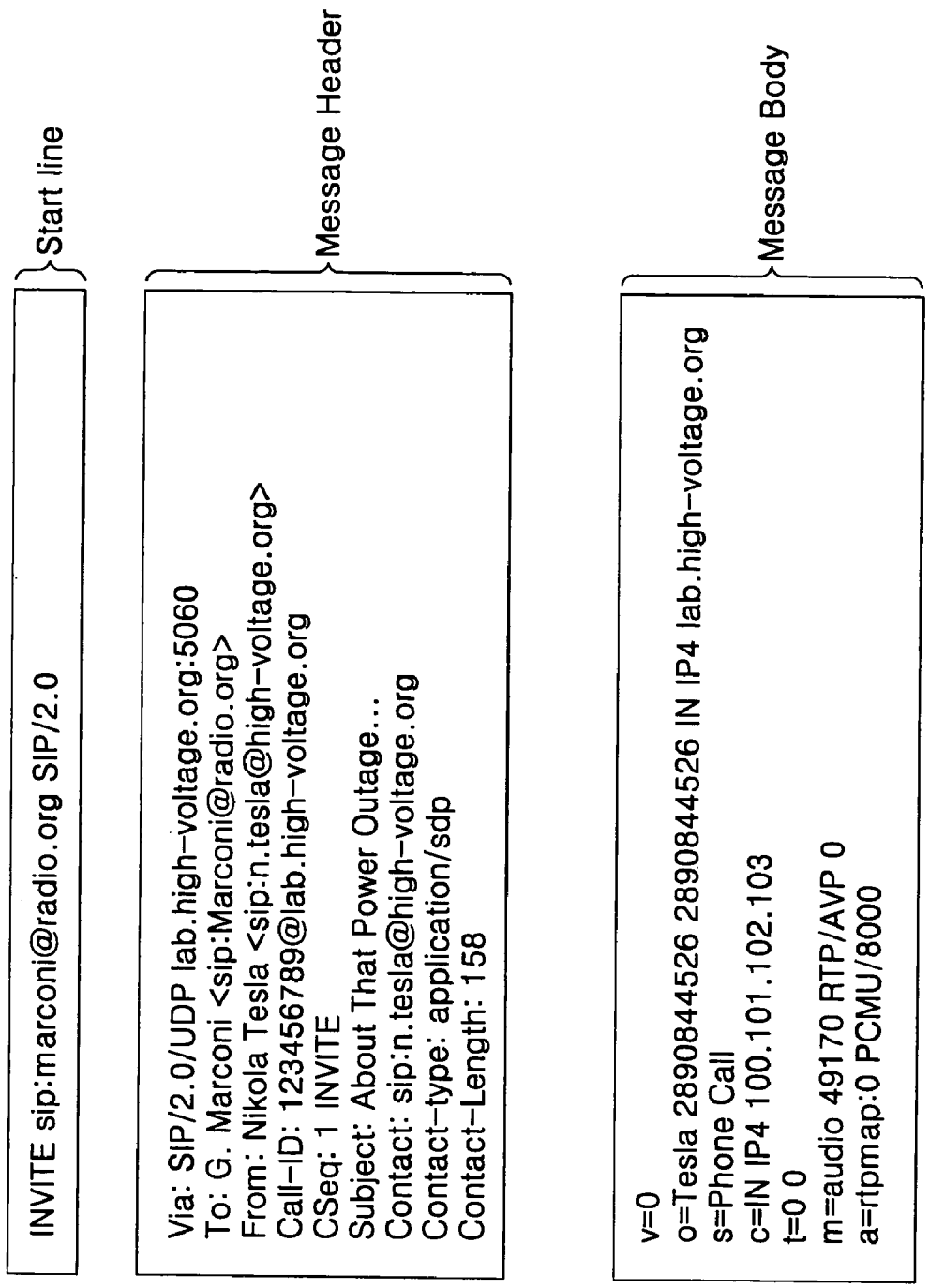

SYMMETRIC NETWORK ADDRESS TRANSLATION SYSTEM USING STUN TECHNIQUE AND METHOD FOR IMPLEMENTING THE SAME

CLAIM OF PRIORITY

This application makes reference to, incorporates the same herein, and claims all benefits accruing under 35 U.S.C.§119 from an application for SYMMETRIC NETWORK ADDRESS TRANSLATOR USING STUN AND METHOD THEREOF earlier filed in the Korean Intellectual Property Office on the Feb. 13, 2006 and there duly assigned Serial No. 10-2006-0013905.

BACKGROUND OF THE INVENTION

1. Technical Field

The present invention relates to a symmetric network address translation system using a Simple Traversal of UDP over NAT (STUN) technique and a method for implementing the same.

2. Related Art

A network address translation (NAT) system is a system which maps private Internet Protocol (IP) addresses used in a private network and a public IP address used in a public network to solve a lack of IP addresses. Computers in the private network which uses such a network address translation cannot be recognized and accessed from an external network.

The NAT system is classified into four systems: full cone; restricted cone; port restricted cone; and symmetric NAT systems. Among them, the symmetric NAT system, to which the present invention pertains, will be described below.

A NAT allocates a port whenever packets are forwarded to computers which are external network terminals, and allows the allocated port a single external connection.

In order to perform this operation, the NAT stores address and port information of the computers and information about an internal terminal, a client, to which a packet is forwarded from the external terminals in a routing table. The NAT receives a packet and compares a destination address and a port number in the received packet to those in the routing table. The NAT relays the packet to the internal terminal, which corresponds to the destination address and the port number.

For example, when the client is in communication with the computer, a private IP address of the client is "10.0.0.1," a port of the client is "8000," an IP address of the computer is "222.111.99.1," and a port of the computer is "20202". Thus, the NAT maps 10.0.0.2:8000 to 222.111.99.1:20202.

If another computer of "222.111.88.2:10101" tries to transmit a packet to the client through the NAT, the NAT blocks transmission of the packet since the destination address and the port of the packet are different from those in the routing table.

The NAT system has many merits, but it restricts use of existing multimedia services and peer to peer (P2P) services. For example, when a voice over Internet protocol (VoIP) is used in a private network environment, a phenomenon whereby media packets are bidirectionally transferred occurs.

Specifically, when the internal terminal transmits an invite message according to a session initiation protocol (SIP), it sends its private IP address inserted in session description protocol (SDP) information. The external terminal sends a media packet to the private IP address of the SDP. However, since the media packets cannot be routed properly when the private IP address is used, a communication between both terminals cannot be performed normally. This problem is referred to as a "NAT traversal problem."

In order to solve the NAT traversal problem, various techniques, such as Simple Traversal of UDP over NAT (STUN), Traversal Using Relay NAT (TURN), Interactive Connectivity Establishment (ICE) and Universal Plug and Play (UPnP), have been introduced.

The TURN needs a high performance server since packets are delayed due to use of a relay server, the ICE has a very complicated algorithm, and the UPnP has a problem in that its algorithm has to be implemented in both the terminal and the NAT. For these reasons, the STUN technique is usually used.

The STUN is a protocol which makes a VoIP Internet phone aware of the existence and type of the NAT.

An Internet phone which supports the STUN protocol queries several times to a STUN server on the Internet in order to know a public IP address and a port number used by the NAT. The internal network terminal replaces a private IP address and a port number included in a session description protocol (SDP) message of the SIP with the public IP address and the port number. Thus, the SIP message and voice traffic can be transmitted via the NAT without changing an NAT set value. However, the STUN cannot be used in a symmetric NAT.

That is, the STUN can be employed in a typical NAT system to resolve the NAT traversal problem, but it cannot be applied to a private network in the symmetric NAT system having a firewall.

Most companies use the symmetric NAT system due to a security issue, and an IP sharing device using the symmetric NAT is increasingly used at home and Small Office/Home Office (SOHO) business sites. In the light of the trends, there is an urgent need for a method for solving the problem whereby the STUN cannot be used in the symmetric NAT system.

SUMMARY OF THE INVENTION

It is an object of the present invention to provide a network address translation (NAT) system and a method for implementing the same in which information about a public Internet Protocol (IP) address and a first port of a router obtained from the STUN server, and information about a private IP address and a second port, are mapped and stored, and wherein a packet received through the public IP address and the first port is transmitted to the private IP address and the second port using the stored mapping information.

According to an exemplary embodiment of the present invention, a voice over Internet protocol (VoIP) network using a network address translation (NAT) technique comprises: a Simple Traversal of UDP over NAT (STUN) server for transmitting to a private network terminal a public IP address and first port information of a router requested by the private network terminal for setting up a session with an external network terminal. The private network terminal transmits a session setup request message, including the public IP address and the first port information of the router for setting up the session with the external network terminal, using its private IP address and a second port, and the router extracts and stores the first port information of the router and the private IP address and second port information of the private network terminal from the session setup request message, and forwards a packet received through the first port to the private network terminal through the private IP address and the second port using the stored information.

The private network terminal preferably transmits a STUN request message for requesting the public IP address and the first port information of the router to the STUN server through the router. The STUN server preferably extracts the public IP address and the first port information included in a source address field of a header of the STUN request message, generates a STUN response message including the public IP address and the first port information of the router in a payload field, and transmits the STUN response message to the private network terminal.

The session setup request message preferably comprises a payload field including the public IP address and the first port information of the router, and a source address field including the private IP address and the second port information of the private network terminal. The router preferably extracts the first port information of the router from the payload field of the session setup request message, and the private IP address and the second port information of the private network terminal from the source address field, and stores the first port information of the router and the private IP address and the second port information of the private network terminal in a NAT table. The session setup request message preferably has a structure according to session initiation protocol (SIP) or H.323.

According to another exemplary embodiment of the present invention, a router supporting a network address translation (NAT) technique comprises: a message recognizing module for collecting a session setup request message which contains a public IP address and first port information of the router, and which is transmitted using a private IP address and a second port of a private network terminal, and for setting up a session between the private network terminal and an external network terminal; a message parsing module for extracting the first port information of the router and the private IP address and the second port information of the private network, from the session setup request message collected by the message recognizing module; and a NAT module for forwarding a packet received through the first port of the router to the private network terminal through the private IP address and the second port using the first port information of the router and the private IP address and the second port information of the private network terminal.

The router preferably further comprises a NAT table for mapping the first port information of the router and the private IP address to the second port information of the private network terminal extracted by the message parsing module, and for storing the mapping information or a conntrack control module for deleting the first port information of the router and the private IP address and the second port information of the private network information from the NAT table when the session setup between the private network terminal and the external network terminal is completed.

The session setup request message preferably comprises a payload field including the public IP address and the first port information of the router, and a source address field including the private IP address and the second port information of the private network terminal. The message parsing module may extract the first port information of the router included in the payload field of the session setup request message and the private IP address and the second port information of the private network terminal included in the source address field of a header of the session setup request message.

The router preferably further comprises a routing table for storing a path to route according to a destination address of the received packet, and a routing module for transmitting the packet to another router or terminal according to the routing path stored in the routing table.

According to yet another exemplary embodiment of the present invention, a VoIP data transceiving method using a network address translation (NAT) technique comprises the steps of: transmitting, from a STUN server to a private network terminal, a public IP address and first port information of a router requested by the private network terminal for setting up a session with an external network terminal; transmitting from the private network terminal a session setup request message, including the public IP address and the first port information of the router, using its private IP address and a second port; at the router, extracting and mapping the first port information of the router and the private IP address and the second port of the private network terminal from the session setup request message, and storing the mapping information in a NAT table; and, at the router, forwarding a packet transmitted through the first port to the private network terminal through the private IP address and the second port by referring to the NAT table.

The step of transmitting, from the STUN server to the private network terminal, the public IP address and the first port of the router preferably comprises the steps of: transmitting, from the private network terminal to the STUN server through the router, a STUN request message for requesting the public IP address and the first port information of the router; at the STUN server, extracting the public IP address and the first port information included in a source address field of a header of the STUN request message; and, at the STUN server, generating a STUN response message including the public IP address and the first port of the router in a payload field, and transmitting the STUN response message to the private network terminal.

The session setup request message preferably comprises a payload field including the public IP address and the first port information of the router, and a source address field including the private IP address and the second port information of the private network terminal.

The step of extracting, at the router, the first port information of the router and the private IP address and the second port information preferably comprises the steps of extracting the first port information of the router from the payload field of the session setup request message, and extracting the private IP address and the second port information of the private network terminal from the source address field.

According to yet another exemplary embodiment of the present invention, a VoIP session setup method using a network address translation (NAT) technique comprises the steps of: transmitting, from a private network terminal to a STUN server through a router, a STUN request message for requesting a public IP address and first port information of the router; at the STUN server, when the STUN request message is received, generating a STUN response message including the public IP address and the first port information in a payload field, and transmitting the STUN response message to the private network terminal; at the private network terminal, transmitting a session setup request message, including the public IP address and the first port information, to the router using its private IP address and a second port; at the router, extracting the first port information of the router and the private IP address and the second port information from the session setup request message, storing the first port information of the router and the private IP address and the second port information in a NAT table, and transmitting the session setup request message to an external network terminal; at the external network terminal, transmitting a session setup response message to the public IP address and the first port of the router included in the session setup request message; and, at the router, comparing the first port included in the session setup response message to the NAT table, and forwarding the session setup response message to the private network terminal through the private IP address and the second port.

The session setup request message preferably comprises a payload field including the public IP address and the first port information of the router, and a source address field including the private IP address and the second port information of the private network terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIGS. 6A, 6B and 6C are diagrams illustrating a message exchanging procedure in a VoIP network according to yet another exemplary embodiment of the present invention;

FIG. 7 is a diagram illustrating a NAT table according to yet another exemplary embodiment of the present invention;

FIG. 8 is a diagram illustrating the structure of a STUN message according to yet another exemplary embodiment of the present invention; and FIG. 9 is a diagram illustrating the structure of a session setup request message according to yet another exemplary embodiment of the present invention.

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness.

Figure 1:
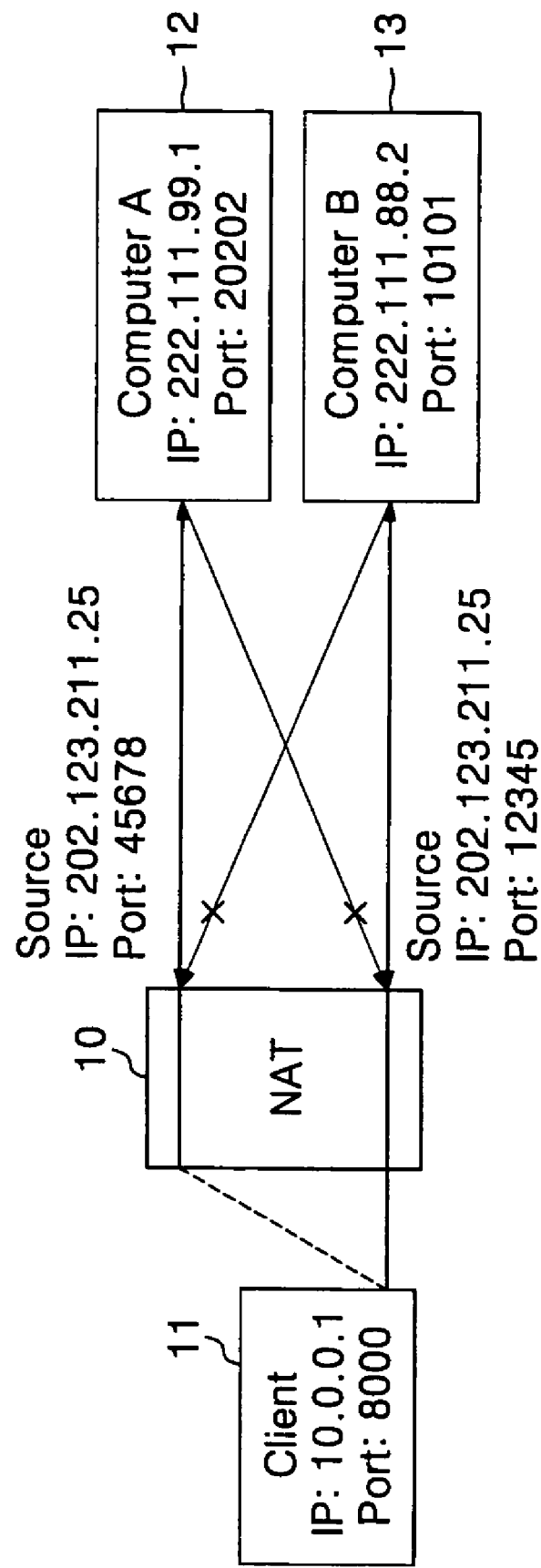
FIG. 1 is a block diagram of the operation of a symmetric NAT system.

FIG. 1 is a block diagram of the operation of a symmetric network address translation (NAT) system.

In FIG. 1, NAT 10 allocates a port whenever packets are forwarded to computer A 12 and computer B 13 which are external network terminals, and allows the allocated port a single external connection.

In order to perform this operation, the NAT 10 stores address and port information of the computers A 12 and B 13 and information about an internal terminal or client 11, to which a packet is forwarded from the computers (external network terminals) 12 and 13, in a routing table. The NAT 10 receives a packet and compares a destination address and a port number in the received packet to those in the routing table. The NAT 10 relays the packet to the internal terminal 111 which corresponds to the destination address and the port number.

For example, when the client 11 is in communication with the computer A 12, a private IP address of the client 111 is "10.0.0.1," a port of the client 111 is "8000," an IP address of the computer A 12 is "222.111.99.1," and a port of the computer A 12 is "20202" as shown in FIG. 1. Thus, the NAT maps 10.0.0.2:8000 to 222.111.99.1:20202.

If the computer B 13 of "222.111.88.2:10101" tries to transmit a packet to the client 11 through the NAT 10, the NAT 10 blocks transmission of the packet since the destination address and the port of the packet are different from those in the routing table.

Figure 2:
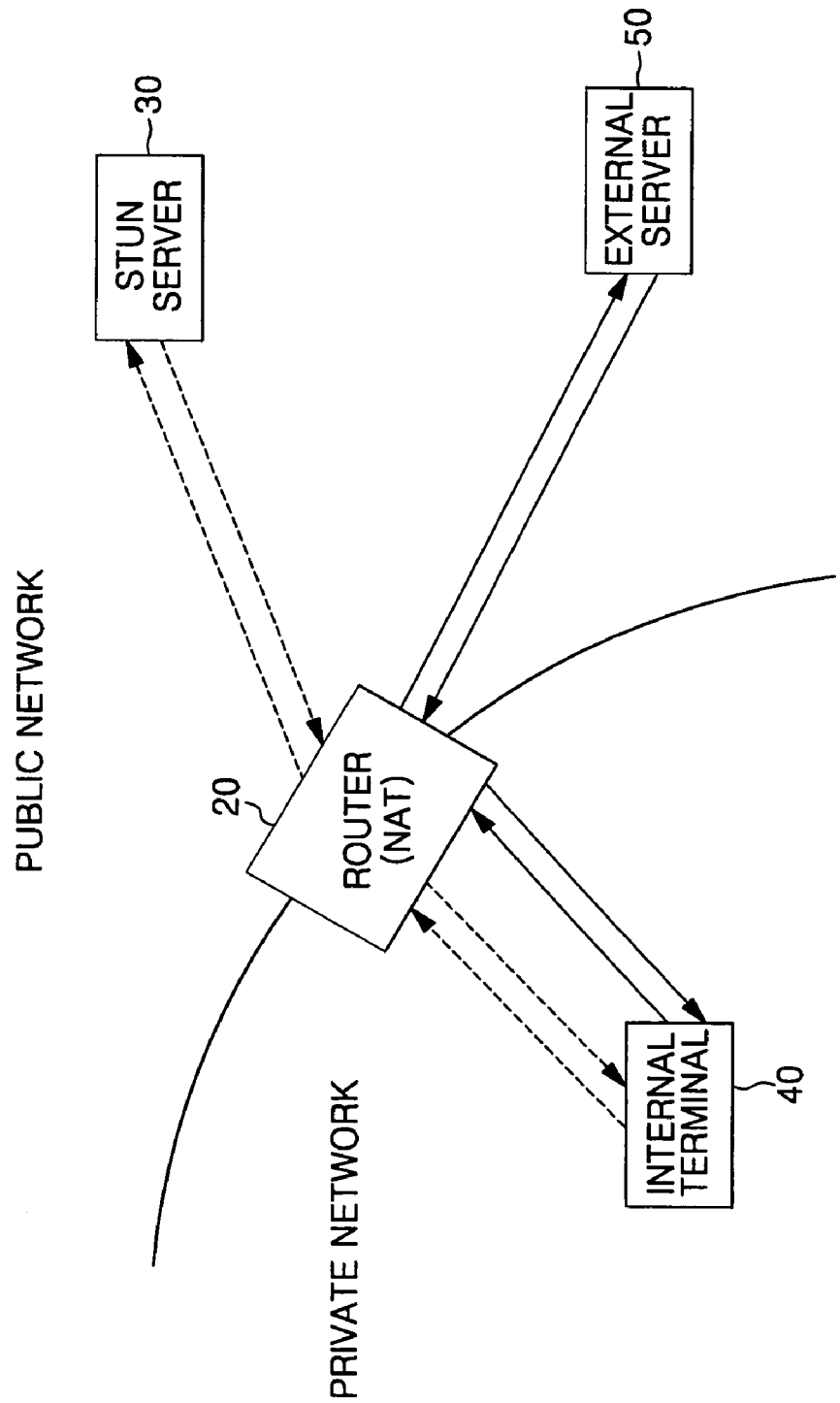
FIG. 2 is a block diagram of the configuration of a VoIP network having a router according an exemplary embodiment of the present invention.

FIG. 2 is a block diagram of the configuration of a voice over Internet protocol (VoIP) network having a router according an exemplary embodiment of the present invention.

Referring to FIG. 2, the VoIP network comprises a router 20, a Simple Traversal of UDP over NAT (STUN) server 30, an internal terminal 40, and an external server 50.

The internal terminal (private network terminal) 40 is a terminal in the private network managed by the router 20, allowing a subscriber of the private network to make a VoIP call. The external terminal (external network terminal) 50 is a terminal in the external network for allowing an external user to make a VoIP call. The subscriber can request a session setup to the external terminal 50, or can accept a session setup request from the external terminal 50 using the internal terminal 40. After a session is set up, the internal terminal 40 and the external terminal 50 perform a voice call function by converting a voice signal into a packet and exchanging it with each other. The terminals 40 and 50 are basically terminals for providing a VoIP voice call service, but the terminals 40 and 50 are not limited only to terminals for a voice call. For example, a device for communicating using payload information of a real-time transport protocol (RTP) packet can be used as the terminals 40 and 50.

The router 20 is a device which connects between two different networks, and it checks a destination Internet Protocol (IP) address included in packet information and relays packets to another communication network via the most appropriate path. The router 20 functions to relay between the internal private network and the external public network. The router 20 supports a function for translating the private IP address into the public IP address, i.e., the NAT function.

The router 20 collects and parses a STUN response message and a session setup request message (i.e., Invite message). The STUN response message contains a public IP address and first port information of the router 20 which the internal terminal 40 is to use for a voice call, and the session setup request message contains a private IP address of the internal terminal 40 for a voice call and second port information which the internal terminal 40 is to use for voice data transmission. The router 20 maps the two addresses and ports to each other so that packets for a voice call are transmitted or received between the internal terminal 40 and the external terminal 50.

The STUN server 30 is a component which uses a STUN technique. The internal terminal 40 transmits to the STUN server 30 a STUN request message for retrieving the public IP address of the router 20 which manages the internal terminal 40.

The STUN server 30 transmits a STUN response message, which contains the public IP address of the router 20 in a payload field other than an IP packet header, to the internal terminal 40. The internal terminal 40 parses the payload field of the STUN response message so as to recognize the public IP address and the first port of the router 20.

Figure 3:
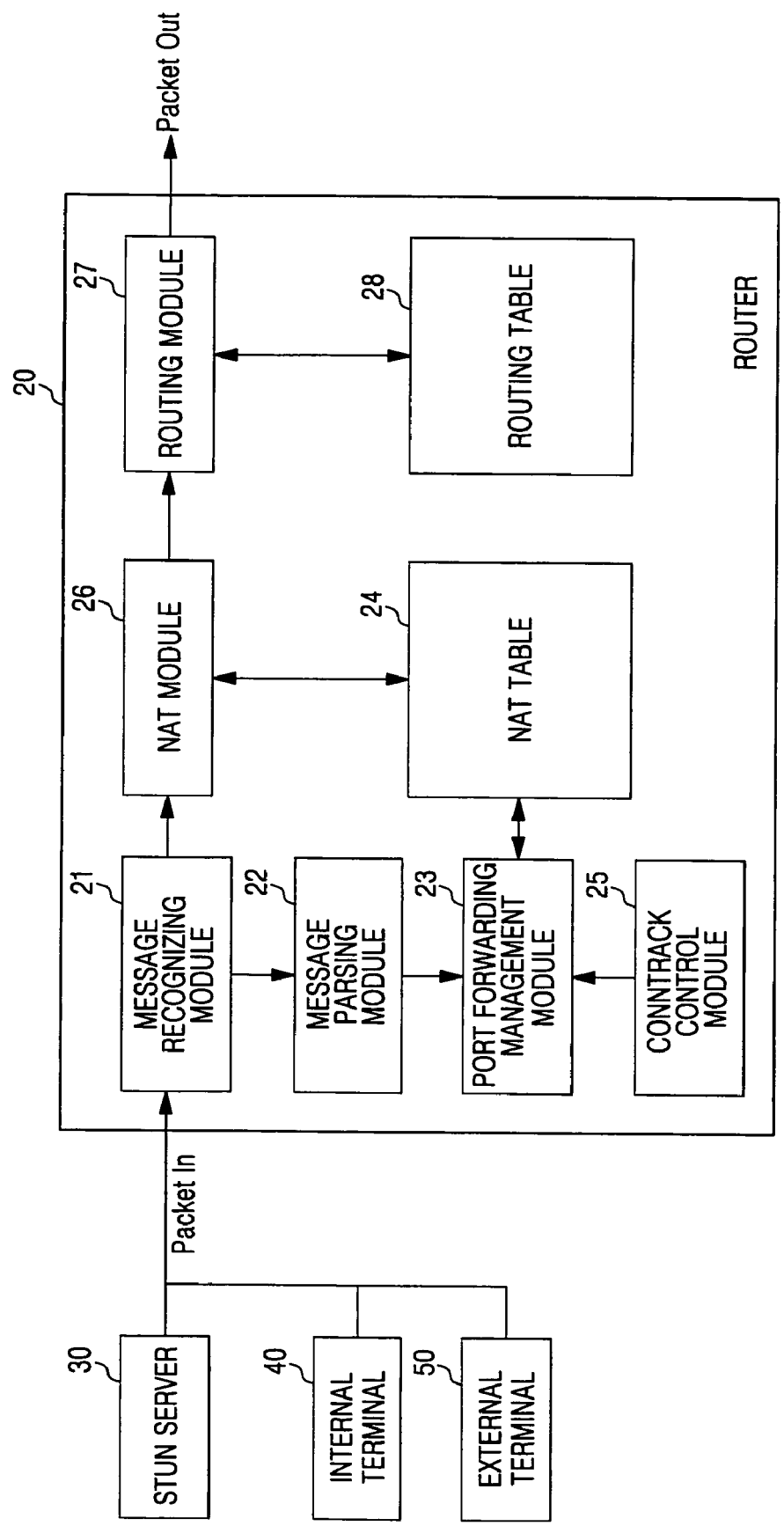
FIG. 3 is a block diagram of a router according to another exemplary embodiment of the present invention.

FIG. 3 is a block diagram of a router according to another exemplary embodiment of the present invention.

The router 20 comprises a message recognizing module 21, a message parsing module 22, a port forwarding management module 23, a NAT table 24, a conntrack control module 25, an NAT module 26, a routing module 27, and a routing table 28.

The message recognizing module 21 collects packets received via the router 20 using packet characteristics. The message parsing module 22 extracts predetermined information from the collected packets. In particular, the message recognizing module 21 parses the STUN response message transmitted from the STUN server 30 to the internal terminal 40, and the session setup request message (i.e., Invite message) transmitted from the internal terminal 40 to the external terminal 50.

More specifically, the message parsing module 22 extracts the public IP address and the port information in the payload field of the STUN response message. A communication between a STUN client, i.e., internal terminal 40 and the STUN server 30, is usually performed via a TCP/UDP 3478 port. The message recognizing module 21 binds the 3478 port to collect the input STUN response message, and the message parsing module 22 extracts the public IP address and the first port information included in the payload field of the collected STUN response message. The public IP address is an IP address allocated to the router 20, and the first port encompasses both a port currently used for a communication between the internal terminal 40 and the STUN server 30, and a port of the router 20 which the internal terminal 40 is to use for a voice call.

The message parsing module 22 parses the session setup message transmitted from the internal terminal 40 to the external terminal 50 so as to recognize the private IP address and the second port information. The private IP address is an IP address allocated to the internal terminal 40, and the second port is a port of the internal terminal 40 which the internal terminal 40 uses for a voice call.

The port forwarding management module 23 stores information for mapping the private IP address and the second port information of the internal terminal 40 managed by the router 20, and the public IP address and the first port information, in the NAT table 24.

The port forwarding management module 23 maps the public IP address and the first port information of the router 20 and the private IP address and the second port information of the internal terminal 40, which are extracted by the message recognizing module 21 and the message parsing module 22, and stores them.

In this regard, "conntrack" means an operation for tracking a connection of an IP address currently registered in the NAT table 24. Conntrack information, such as a source IP address and port, a destination IP address and port, and timeout information of a connected session, can be recognized by the conntrack operation.

The conntrack control module 25 of the present invention continuously monitors the conntrack information, and controls the port forwarding management module 23 to delete the information after a session is set up between the internal terminal 40 and the external terminal 50.

The NAT table 24 is a database which stores the public IP address and the first port and the private IP address and the second port which are mapped. The NAT module 26 translates the address of the received packet by referring to the NAT table 24 so that the received packet is routed. The routing module 27 routes packets to another router or terminals using the routing table 28.

A voice call method using the router having the above elements will now be described.

Figure 4A:
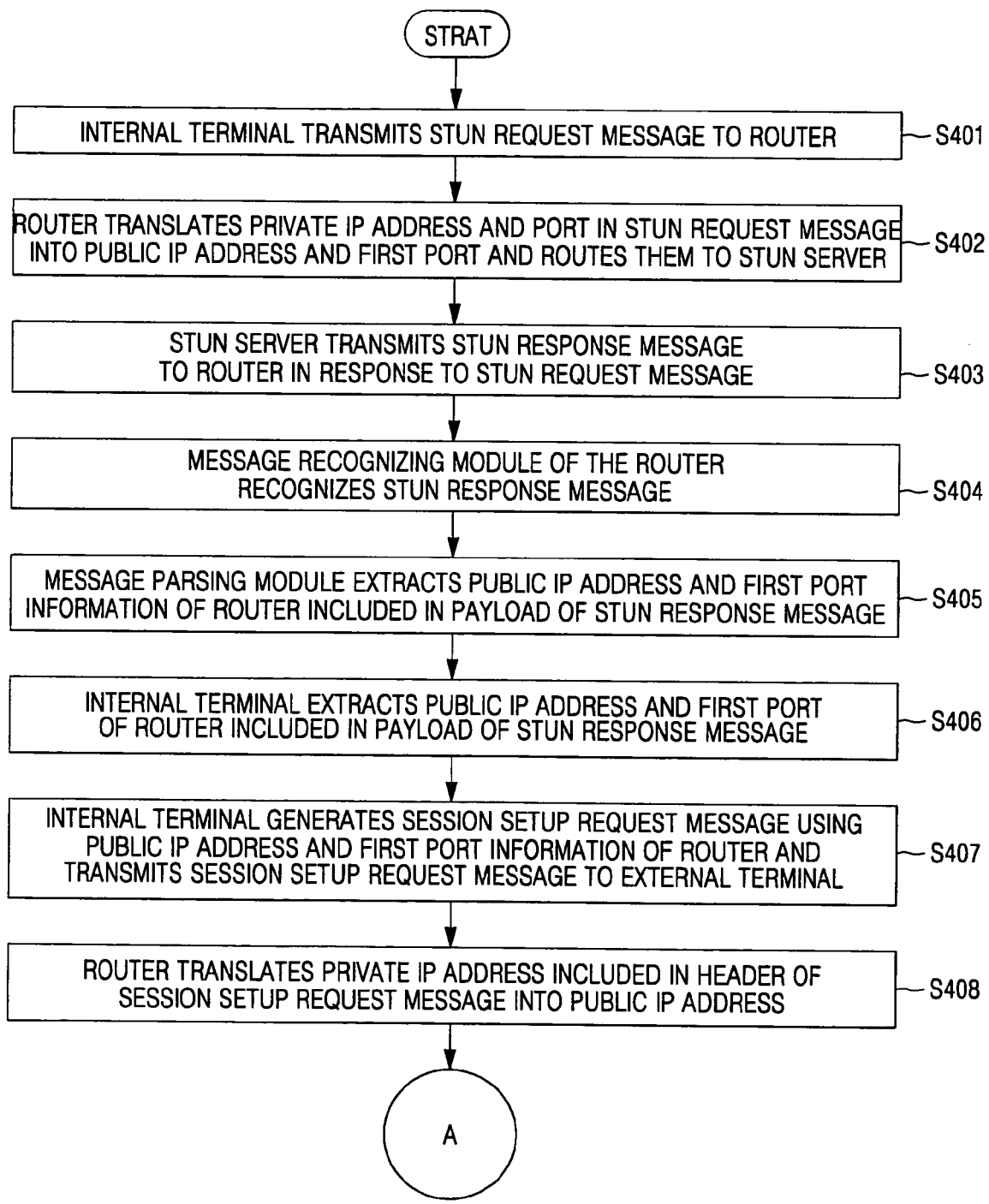
FIGS. 4A and 4B together form a flowchart of a voice call method according to yet another exemplary embodiment of the present invention.
Figure 4B:
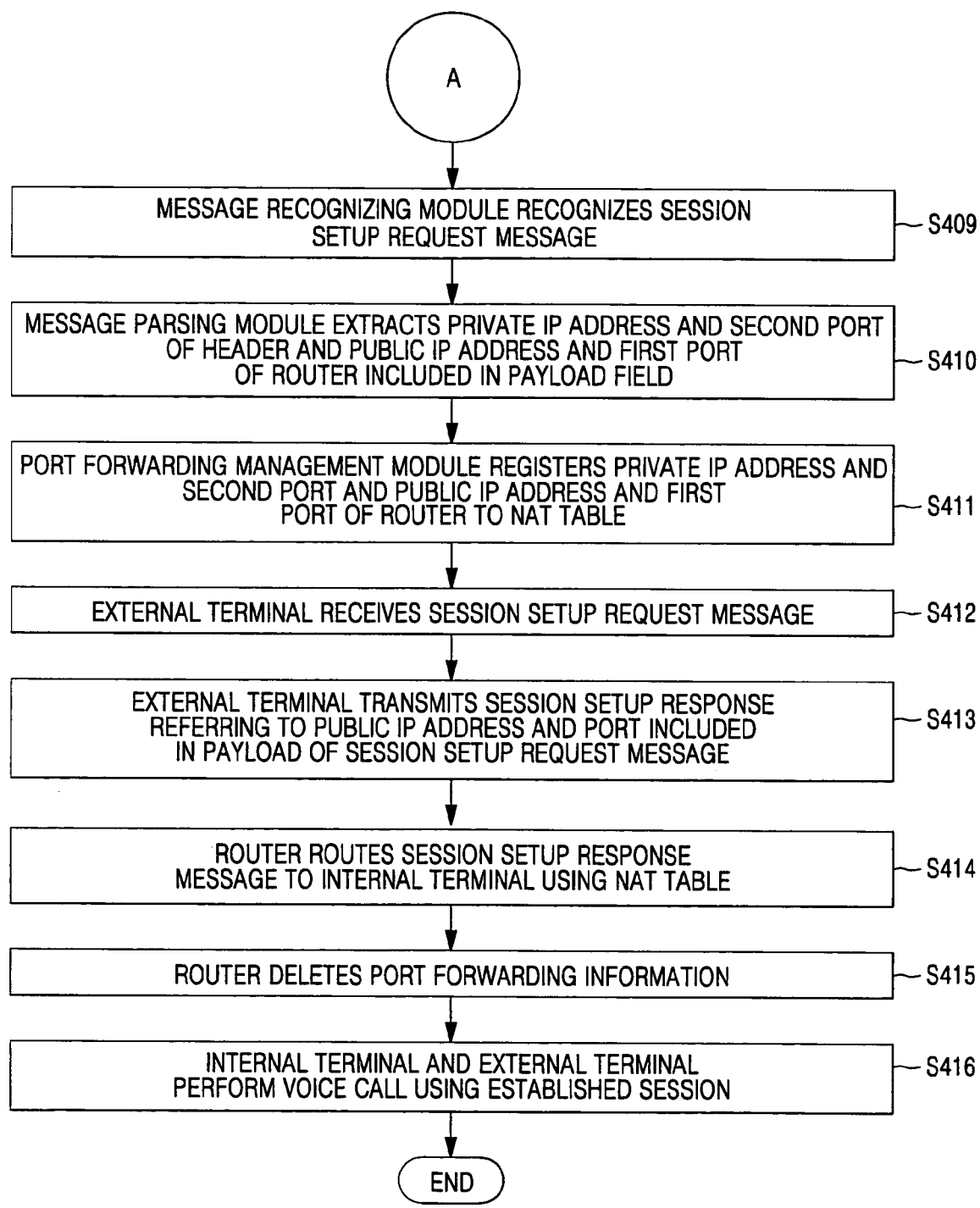

FIGS. 4A and 4B together form a flowchart of a voice call method according to yet another exemplary embodiment of the present invention.

The internal terminal 40 managed by the router 20 transmits a STUN request message to the STUN server 30 via the router 20 (S401). The router 20 translates the private IP address and the port in the STUN request message received from the internal terminal into the public IP address and the first port, and routes the message to the STUN server 30 (S402).

The STUN server 30 transmits the STUN response message to the router 20 in response to the STUN request message received from the router 20 (S403).

The message recognizing module 21 of the router 20 checks the port in the header of the STUN response message so as to recognize the STUN response message (S404). The message parsing module 22 extracts the public IP address and the first port information of the router 20 included in the payload of the STUN response message (S405).

At the same time, the STUN response message is transmitted to the internal terminal 40, and the internal terminal parses the STUN response message to recognize the public IP address and the first port of the router 20 included in the payload of the STUN response message (S406).

The internal terminal 40 generates a session setup request message (Invite message) which contains the public IP address and the first port information of the router 20 recognized in step S406 in its payload field, and transmits the session setup request message to the external terminal 50 (S407). In the case of using the SIP, the public IP address and the first port information of the router 20 may be included in an SDP field of the session setup request message.

The router 20 translates the private IP address, included in the header of the session setup request message transmitted from the internal terminal 40, into the public IP address (S408). Since the source address in the header of the session setup request message is the private IP address and the second port of the internal terminal 40, the source address in the header of the session setup request message is translated into the public IP address and the first port of the router 20 so that the routing can be performed in the public network.

The message recognizing module 21 recognizes the session setup request message (S409), and the message parsing module 22 parses the session setup request message to extract the private IP address and the second port of the internal terminal 40 and the public IP address and the first port of the router 20 included in the payload field (S410).

The port forwarding management module 23 registers, in the NAT table 24, the private IP address and the second port extracted in step S410 and the public IP address and the first port of the router 20 included in the payload field (S411).

The external terminal 50 receives the session setup request message (S412), and transmits the session setup response message by referring to the payload information of the session setup request message (S413).

The NAT module 26 routes the session setup response message to the internal terminal 40 using the NAT table 24 produced in step S411 (S414). When the internal terminal 40 and the external terminal 50 are connected to each other, the conntrack control module 25 deletes the port forwarding information registered in step S411 from the NAT table 24 (S415). Accordingly, the internal terminal 40 and the external terminal 50 perform a voice call using the established connection (S416).

Figure 5:
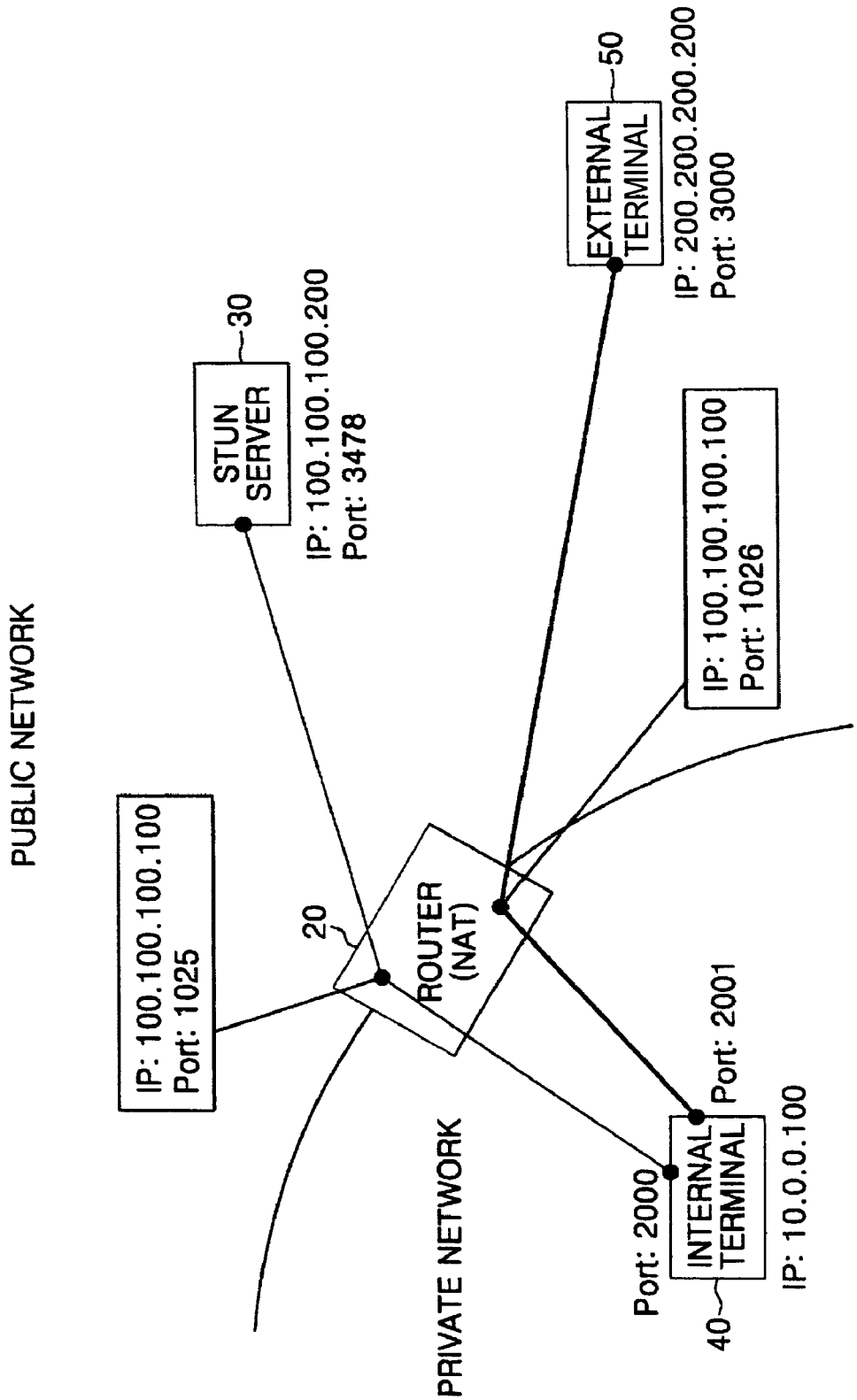
FIG. 5 is a block diagram of the configuration of a VoIP network according to yet another exemplary embodiment of the present invention.

FIG. 5 is a block diagram of the configuration of a VoIP network according to yet another exemplary embodiment of the present invention.

It is assumed that the public IP address of the router 20 is "100.100.100.100," the public IP address of the STUN server 30 is "100.100.100.200," the private IP address of the 11 internal terminal 40 is "10.0.0.100," and the IP address of the external terminal 50 is "200.200.200.200," as shown in FIG. 5

The internal terminal 40 communicates with the STUN server 30 via a 2000 port and exchanges voice data with the external terminal 50 via a 2001 port. The router 20 communicates with the STUN server 30 via a 1025 port and communicates with the external terminal 50 via a 1026 port. The STUN server exchanges a STUN message via a 3478 port. The external terminal 50 performs a voice call via a 3000 port.

Figure 6C:
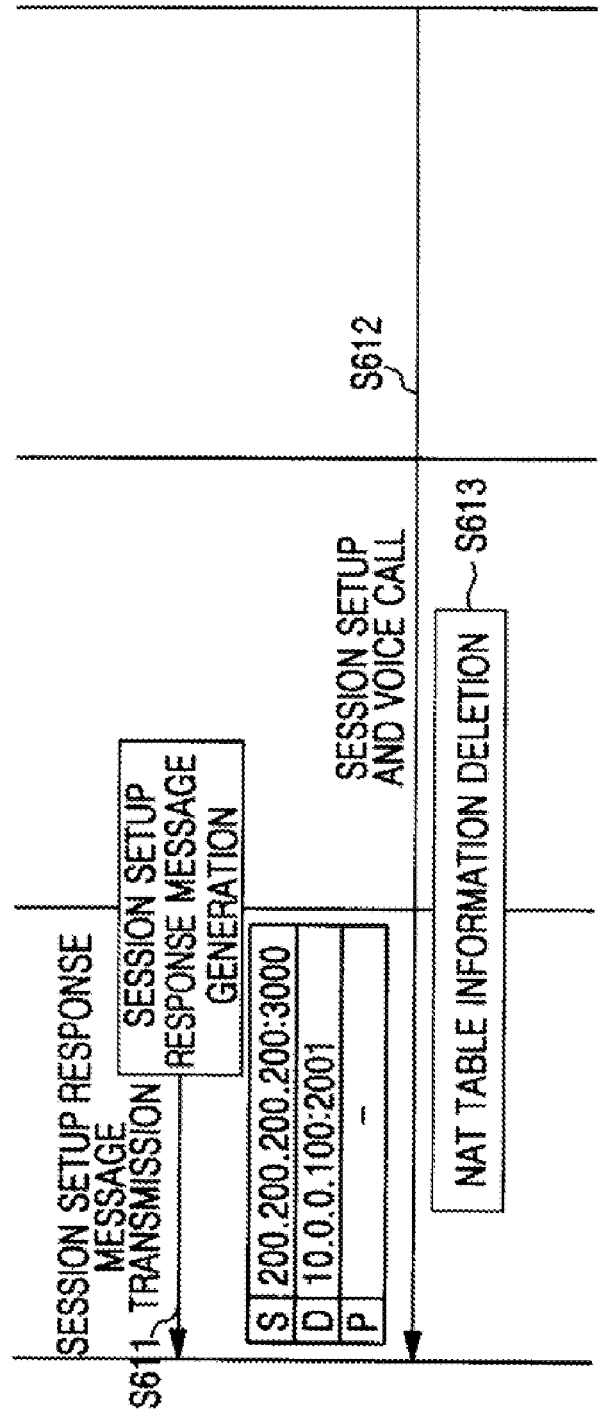

FIGS. 6A, 6B and 6C are diagrams illustrating a message exchanging procedure in a VoIP network according to yet another exemplary embodiment of the present invention.

The message exchanging procedure is performed under the network environment of FIG. 5. The addresses and ports of the router 20, the STUN server 30, the internal terminal 40, and the external terminal 50 are set in the same way as in FIG. 5. In messages of FIG. 6, "S" denotes a source address, "D" denotes a destination address, and "P" denotes an address included in a payload field.

A procedure by which the internal terminal 40 exchanges the STUN message with the STUN server 30 will be first described.

The internal terminal 40 transmits the STUN request message, including "10.0.0.100:2000" in a source address field of the IP header and "100.100.100.200:3478" in a destination address field, to the router 20 (S601).

The router 20 translates the source address into the public IP address of the router 20 (S602). That is, "10.0.0.100:2000" in the source address field is translated into "100.100.100.100:1025." The translated STUN request message is transmitted to the STUN server 30 (S603).

The STUN server 30 transmits the STUN response message to the router 20 (S604). The STUN server 30 generates the STUN response message using "100.100.100.100:1025" which is the source address information of the STUN request message. The STUN response message contains "100.100.100.200:3478" in the source address field and "100.100.100.100:1025" in the destination address field. The STUN server 30 also inserts "100.100.100.100:1025" into the payload field of the STUN response message and transmits it.

The router 20 receives the STUN response message and maps the 1025 port so as to route the STUN response message to the internal terminal 40 whose address is "10.0.0.100:2000" (S605).

The STUN response message contains the public IP address "100.100.100.100:1025" of the router 20 in the payload field, and the internal terminal 40 extracts it to generate the session setup request message for a voice call (S606).

The internal terminal 40 transmits the session setup request message to the router 20 in order to communicate with the external terminal 50 (S607). "100.100.100.100:1025" extracted in step S606 is included in a payload field of the session setup message. The private IP address 10.0.0.100 of the internal terminal 40 and a 2001 port newly used for a voice call are stored as the source address in the IP header of the session setup request message. The session setup request message further contains "200.200.200.200:3000", which is the information about the public IP address and the port of the external terminal 50, in the destination address field of the IP header.

The router 20 stores the information included in the payload field of the session setup message and the source IP address and port information of the IP header in the NAT table 24. (S608) The information included in step S607, that is, the information included in the payload field of the session request message, is "100.100.100.100:1025," and the source IP address and port information of the IP header is "10.0.0.100:2001." The router 20 maps the information and stores them in the NAT table 24. The NAT table 24 storing the information is shown in FIG. 7.

The router 20 replaces the source address information in the header of the session setup request message with "100.100.100.100:1026", which is the public IP address and port of the router 20, and routes the session request message to the external terminal 50 (S609).

The external terminal 50 transmits the session setup response message to the router 20 (S610). The session setup response message contains "200.200.200.200:3000" in the source address field of the IP header and "100.100.100.100:1025" in the destination address field. The destination address included in the session setup response message is not "100.100.100.100:1026", but it is "100.100.100.100:1025", because the external terminal 50 generates the session setup response message by referring to the payload field information of the session setup request message.

The router 20 receives the session setup response message, extracts the destination address and port in the IP header, and routes the session setup response message to the internal terminal 40 by referring to the information of the NAT table 24 produced in step S608 (S611). The destination address of the session setup response message currently set is "100.100.100.100:1025." Referring to the NAT table 24, the IP address and port of the internal terminal 40 mapped with the destination address is "10.0.0.100:2001."

The session setup response message is relayed to the voice call port of the internal terminal 40, and a session is set up between the internal terminal 40 and the external terminal 50. When the session is set up between the internal terminal 40 and the external terminal 50, RTP packets are exchanged to perform an Internet voice call (S612).

At this point, when the session is set up between the internal terminal 40 and the external terminal 50, since the address and port information may be misused as a path for tap, the router may delete the mapping information of "100.100.100.100:1025" and "10.0.0.100:2001" from the NAT table 24 (S613).

FIG. 7 is a diagram illustrating a NAT table according to yet another exemplary embodiment of the present invention.

The NAT table 24 comprises a table 24a for outgoing packets and a table 24b for incoming packets.

In the table 24a for outgoing packets, a first entry is a mapping table for a communication between the STUN server 30 and the internal terminal 40, and a second entry is a mapping table for packet transmission and reception between the internal terminal 40 and the external terminal 50.

In the table 24b for incoming packets, a first entry maps "100.100.100.100:1025" to "10.0.0.100:2001." Using this information, the NAT module 26 receives the session setup response message including "100.100.100.100:1025" as the destination IP address and port information, and transmits the session setup response message to the internal terminal 40 of "10.0.0.100:2001."

FIG. 8 is a diagram illustrating the structure of an STUN message according to yet another exemplary embodiment of the present invention.

As shown in FIG. 8, the STUN message may contain a message header, a message attribute, and mapped address fields.

The message header field contains a STUN message type field indicating the type of STUN message, a message length field indicating the message length, and a transaction ID field.

The message attribute field contains a type field indicating a type of an address included in the STUN message.

The mapped address field contains an 8-bit family address, 16-bit port information, and 32-bit IP address information.

The STUN message is defined in detail in RFC3489.

FIG. 9 is a diagram illustrating the structure of a session setup request message according to yet another exemplary embodiment of the present invention.

As shown in FIG. 9, the session setup request message is based upon an SIP. The session setup message comprises a start line, a message header, and a message body.

The start line indicates that the session setup request message is based upon the SIP. A To field and a From field of the message header indicate a destination address and a source address, respectively. The message body contains session configuration setup information, including an address, a port, and format information for transmitting a media stream.

An example of a session description protocol (SDP) according to the SIP protocol is shown in FIG. 9, but an initial session connection is set up even with an H.323 protocol. In this case, the two terminals exchange information, such as an address, a port, and a media format, and the router extracts the information to generate the NAT system.

The present invention can be applied to the case of an Internet call using an RTP packet. That is, the present invention can be applied to the case where a session is set up using SIP, H.323 or MEGACO.

While the present invention has been described in connection with a VoIP call, the present invention can be applied to the case where there is a difficulty in communication between a private network terminal and an external network terminal using the NAT system, as in RTP packet transmission and reception.

As described above, with the symmetric NAT system and the method of implementing the same according to the present invention, a router is provided to map the public IP address and the first port of the router to the private IP address and the second port of the private network terminal for a VoIP call, and to store the mapping information, and the router routes packets received through the public IP address and the first port to the private IP address and the second port, whereby the STUN technique for solving the NAT traversal problem can be applied to the symmetric NAT system.

While the present invention has been described with reference to exemplary embodiments thereof, it will be understood by those skilled in the art that various changes in form and detail may be made therein without departing from the scope of the present invention as defined by the following claims.

What is claimed is:

1. A network using a network address translation (NAT) technique, comprising:
    a Simple Traversal of UDP over NAT (STUN) server for transmitting to a private network terminal a public Internet Protocol (IP) address and first port information of a router requested by the private network terminal for setting up a session with an external network terminal;
    wherein the private network terminal transmits a session setup request message, including the public IP address and the first port information of the router for setting up the session with the external network terminal, using its private IP address and a second port,
    wherein the session setup request message comprises a payload field including the public IP address and the first port information of the router, and a source address field including the private IP address and the second port information of the private network terminal, and
    wherein the router extracts the first port information of the router from the payload field of the session setup request message, and the private IP address and the second port information of the private network terminal from the source address field, and stores the first port information of the router and the private IP address and the second port information of the private network terminal in a NAT table, and forwards a packet received through the first port to the private network terminal through the private IP address and the second port using the stored information.

2. The network of claim 1, wherein the private network terminal transmit a STUN request message, requesting the public IP address and the first port information of the router, to the STUN server through the router.

3. The network of claim 2, wherein the STUN server extracts the public IP address and the first port information of the router included in a source address field of a header of the STUN request message, generates a STUN response message including the public IP address and the first information of the router in a payload field, and transmit the STUN response message to the private network terminal.

4. The network of claim 1, wherein the session setup request message has a structure in accordance with one of session initiation protocol (SIP) and H.323.

5. A router supporting a network address translation (NAT) technique, comprising:
    a message recognizing module for collecting a session setup request message which includes a public Internet Protocol (IP) address and first port information of the router, and which is transmitted using a private IP address and a second port of a private network terminal, for setting up a session between the private network terminal and an external network terminal;
    a message parsing module for extracting the first port information of the router and the private IP address and the second port information of the private network from the session setup request message collected by the message recognizing module;
    a NAT module for forwarding a packet, received through the first port of the router, to the private network terminal through the private IP address and the second port using the first port information of the router and the private IP address and the second port information of the private network terminal;
    a NAT table for mapping the first port information of the router to the private IP address and the second port information of the private network terminal extracted by the message parsing module to obtain mapping information, and for storing the mapping information; and
    a conntrack control module for deleting the first port information of the router and the private IP address and the second port information of the private network information from the NAT table when the session setup between the private network terminal and the external network terminal is completed.

6. The router of claim 5, further comprising a routing table for storing a routing path for routing according to a destination address of the received packet, and a routing module for transmitting the packet to one of another router and another terminal according to the routing path stored in the routing table.

7. The router of claim 5, wherein the session setup request message has a structure in accordance with one of session initiation protocol (SIP) and H.323.

8. A data transceiving method using a network address translation (NAT) technique, comprising the steps of:
    transmitting, by a Simple Traversal of UDP over NAT (STUN) server to a private network terminal, a public Internet Protocol (IP) address and first port information of a router requested by the private network terminal for setting up a session with an external network terminal;
    transmitting, by the private network terminal, a session setup request message, including the public IP address and the first port information of the router, using a private IP address of the private network terminal and a second port;

extracting and mapping, at the router, the first port information of the router and the private IP address and the second port of the private network terminal from the session setup request message to obtain mapping information, and storing the mapping information in an NAT table, wherein the step of extracting, at the router, the first port information of the router and the private IP address and the second port information comprises extracting the first port information of the router from the payload field of the session setup request message, and extracting the private IP address and the second port information of the private network terminal from the source address field; and forwarding, by the router, a packet transmitted through the first port to the private network terminal, the packet being forwarded through the private IP address and the second port by referring to the NAT table.

9. The method of claim 8, wherein the step of transmitting, by the STUN server, the public IP address and the first port of the router to the private network terminal comprises the steps of:

transmitting, by the private network terminal to the STUN server through the router, a STUN request message for requesting the public IP address and the first port information of the router;

extracting, at the STUN server, the public IP address and the first port information included in a source address field of a header of the STUN request message; and generating, at the STUN server, a STUN response message including the public IP address and the first port of the router in a payload field, and transmitting the STUN response message to the private network terminal.

10. The method of claim 8, wherein the session setup request message further comprises a start line, a message header, and a message body, wherein the start line indicates that the session setup request message is based upon a Session Initiation Protocol (SIP), wherein the message header indicates a destination address and a source address, and wherein the message body contains session configuration setup information, including an address, a port, and format information for transmitting a media stream.

11. The method of claim 8, wherein the session setup request message has a structure in accordance with one of session initiation protocol (SIP) and H.323.

12. A voice over Internet protocol (VoIP) session setup method using a network address translation (NAT) technique, comprising the steps of:

transmitting, by a private network terminal to a STUN server through a router, a Simple Traversal of UDP over NAT (STUN) request message for requesting a public Internet Protocol (IP) address and first port information of the router;

when the STUN request message is received, generating, at the STUN server, a STUN response message including the public IP address and the first port information in a payload field, and transmitting the STUN response message to the private network terminal;

transmitting, by the private network terminal to the router using a private IP address of the private network terminal and a second port, a session setup request message including the public IP address and the first port information, wherein the session setup request message comprises a payload field including the public IP address and the first port information of the router, and a source address field including the private IP address and the second port information of the private network terminal;

extracting, at the router, the first port information of the router from the payload field of the session setup request message, and extracting the private IP address and the second port information of the private network terminal from the source address field; storing, at the router, the first port information of the router and the private IP address and the second port information in a NAT table, and transmitting the session setup request message to an external network terminal;

transmitting, by the external network terminal, a session setup response message to the public IP address and the first port of the router included in the session setup request message; and comparing, at the router, the first port included in the session setup response message to the NAT table, and forwarding the session setup response message to the private network terminal through the private IP address and the second port.

13. The method of claim 12, wherein the session setup request message further comprises a start line, a message header, and a message body, wherein the start line indicates that the session setup request message is based upon a Session Initiation Protocol (SIP), wherein the message header indicates a destination address and a source address, and wherein the message body contains session configuration setup information, including an address, a port, and format information for transmitting a media stream.

14. A router supporting a network address translation (NAT) technique, comprising:

a message recognizing module for collecting a session setup request message which includes a public Internet Protocol (IP) address and first port information of the router, and which is transmitted using a private IP address and a second port of a private network terminal, for setting up a session between the private network terminal and an external network terminal, wherein the session setup request message comprises a payload field including the public IP address and the first port information of the router, and a source address field including the private IP address and the second port information of the private network terminal;

a message parsing module for extracting the first port information of the router and the private IP address and the second port information of the private network from the session setup request message collected by the message recognizing module, wherein the message parsing module extracts the first port information of the router included in the payload field of the session setup request message, and the private IP address and the second port information of the private network terminal included in the source address field of a header of the session setup request message; and a NAT module for forwarding a packet, received through the first port of the router, to the private network terminal through the private IP address and the second port using the first port information of the router and the private IP address and the second port information of the private network terminal.

15. The router of claim 14, further comprising a routing table for storing a routing path for routing according to a destination address of the received packet, and a routing module for transmitting the packet to one of another router and another terminal according to the routing path stored in the routing table.

16. The router of claim 14, wherein the session setup request message has a structure in accordance with one of session initiation protocol (SIP) and H.323.

* * * * *